(12) United States Patent
Mian et al.

(10) Patent No.: US 10,970,851 B2
(45) Date of Patent: Apr. 6, 2021

(54) OPERATIONS MONITORING IN AN AREA

(71) Applicant: International Electronic Machines Corporation, Troy, NY (US)

(72) Inventors: Zahid F. Mian, Loudonville, NY (US); Ronald W. Gamache, East Greenbush, NY (US); Ryk E. Spoor, Troy, NY (US)

(73) Assignee: International Electronic Machines Corp., Troy, NY (US)

( * ) Notice: Subject to any disclaimer, the term of this patent is extended or adjusted under 35 U.S.C. 154(b) by 0 days.

(21) Appl. No.: 16/272,277

(22) Filed: Feb. 11, 2019

(65) Prior Publication Data

US 2019/0185036 A1 Jun. 20, 2019

Related U.S. Application Data

(63) Continuation of application No. 14/279,385, filed on May 16, 2014, now Pat. No. 10,202,135.
(Continued)

(51) Int. Cl.
*G06T 7/246* (2017.01)
*G08G 1/017* (2006.01)
(Continued)

(52) U.S. Cl.
CPC ............ *G06T 7/246* (2017.01); *B61L 23/041* (2013.01); *B61L 29/30* (2013.01); *G06K 9/00335* (2013.01); *G06K 9/00771* (2013.01); *G06K 9/00785* (2013.01); *G06K 9/6293* (2013.01); *G06T 7/194* (2017.01); *G06T 7/20* (2013.01); *G06T 7/215* (2017.01); *G06T 7/254* (2017.01);
(Continued)

(58) Field of Classification Search
None
See application file for complete search history.

(56) References Cited

U.S. PATENT DOCUMENTS 7,355,508 B2 4/2008 Mian et al.
8,188,430 B2 5/2012 Mian
(Continued)

FOREIGN PATENT DOCUMENTS

CN 102750515 A 10/2012
JP H0721386 A 1/1995
JP 2009278249 A 11/2009

OTHER PUBLICATIONS

Chinese Application No. 201480029128.9, Office Action4, dated May 14, 2019, received May 28, 2019, 11 pages with EN Translation.
(Continued)

*Primary Examiner* — David N Werner
(74) *Attorney, Agent, or Firm* — LaBatt, LLC

(57) ABSTRACT

An assembly for monitoring an area is provided. The assembly can include two or more cameras sensitive to radiation of distinct wavelength ranges. The fields of view of the cameras can be substantially co-registered at the area to be monitored. The assembly can include a computer system which can process the image data to monitor the area. The computer system can be configured to identify relevant objects present in the area, update tracking information for the relevant objects, and evaluate whether an alert condition is present using the tracking information.

20 Claims, 7 Drawing Sheets

Related U.S. Application Data

(60) Provisional application No. 61/855,517, filed on May 17, 2013.

(51) Int. Cl.

| | | |
|---|---|---|
| *G08G 1/16* | (2006.01) | |
| *G08G 1/005* | (2006.01) | |
| *G08G 1/04* | (2006.01) | |
| *B61L 23/04* | (2006.01) | |
| *G06K 9/00* | (2006.01) | |
| *G06K 9/62* | (2006.01) | |
| *G06T 7/254* | (2017.01) | |
| *G06T 7/194* | (2017.01) | |
| *G06T 7/20* | (2017.01) | |
| *G06T 7/215* | (2017.01) | |
| *G08B 13/14* | (2006.01) | |
| *B61L 29/30* | (2006.01) | |

(52) U.S. Cl.
CPC ......... *G08B 13/1436* (2013.01); *G08G 1/005* (2013.01); *G08G 1/017* (2013.01); *G08G 1/0175* (2013.01); *G08G 1/04* (2013.01); *G08G 1/166* (2013.01); *G06T 2207/10016* (2013.01); *G06T 2207/10048* (2013.01); *G06T 2207/20221* (2013.01); *G06T 2207/30236* (2013.01)

(56) References Cited

U.S. PATENT DOCUMENTS

| | | | |
|---|---|---|---|
| 8,335,606 B2 | 12/2012 | Mian et al. | |
| 8,601,494 B2 | 12/2013 | Brown et al. | |
| 8,614,744 B2 | 12/2013 | Brown et al. | |
| 8,687,065 B2 | 4/2014 | Connell | |
| 10,202,135 B2 | 2/2019 | Mian et al. | |
| 2005/0159893 A1* | 7/2005 | Isaji | G06T 7/74 701/301 |
| 2005/0231387 A1 | 10/2005 | Markelz | |
| 2006/0028356 A1 | 2/2006 | Pieralli | |
| 2007/0279494 A1 | 12/2007 | Aman et al. | |
| 2009/0243844 A1 | 10/2009 | Ishidera | |
| 2009/0289187 A1 | 11/2009 | Mian et al. | |
| 2010/0007736 A1 | 1/2010 | Mori et al. | |
| 2010/0013656 A1 | 1/2010 | Brown et al. | |
| 2010/0182433 A1 | 7/2010 | Shimbo et al. | |
| 2011/0084176 A1 | 4/2011 | Reichelt et al. | |
| 2012/0269383 A1 | 10/2012 | Bobbitt et al. | |
| 2014/0010441 A1* | 1/2014 | Shamaie | G06K 9/00335 382/164 |
| 2014/0056479 A1* | 2/2014 | Bobbitt | G06K 9/00718 382/104 |

OTHER PUBLICATIONS

Molinier Matthieu et al: "3O-Connected Components Analysis for Traffic Monitoring in Image Sequences Acquired from a Helicopter", Jun. 19, 2005 (Jun. 19, 2005), Image Analysis and Recognition.
Canadian Application No. 2910492, Office Action 3, dated Jun. 25, 2019, 8 pages.
Canadian Application No. 2910492, Office Action 3, dated Sep. 26, 2018, 8 pages.
Werner, D., U.S. Appl. No. 14/279,385, Notice of Allowance, dated Oct. 3, 2018, 7 pages.
Werner, D., U.S. Appl. No. 14/279,385, Final Rejection2, dated Dec. 26, 2017, 19 pages.
Werner, D., U.S. Appl. No. 14/279,385, Non-Final Rejection2, dated Jun. 23, 2017, 25 pages.
Werner, D., U.S. Appl. No. 14/279,385, Final Rejection1, dated Jan. 11, 2017, 28 pages.
Werner, D., U.S. Appl. No. 14/279,385, Non-Final Rejection1, dated Jun. 24, 2016, 28 pages.
European Application No. EP 14 79 8058, European Search Report1, dated Dec. 14, 2016, 7 pages.
Chinese Application No. 201480029128.9, Office Action1, dated Mar. 20, 2018, 10 pages (An English translation is not available).
Canadian Application No. 2910492, Office Action2, dated Jan. 25, 2018, 7 pages.
Canadian Application No. 2910492, Office Action1, dated Jan. 19, 2017, 4 pages.
Australian Application No. 2017201095, Notice of Acceptance, dated May 31, 2018, 3 pages.
Australian Application No. 2017201095, Examination Report1, dated Dec. 12, 2017, 3 pages.
Australian Application No. 2014265298, Examination Report1, dated Jun. 14, 2016, 3 pages.
Copenheaver, B., International Search Report and Written Opinion, dated Oct. 13, 2015, 12 pages.
ImageSensing Sytems, Improving the free flow of the road network with ALPR, 2013, 4 pages.
Chinese Application No. 201480029128.9, Office Action3, dated Feb. 2, 2019, 11 pages (An English translation is not available).
Canadian Application No. 2910492, Notice of Allowance, dated Oct. 9, 2020, 1 page.
European Application No. EP 14798058.5, Examination Report dated Jun. 6, 2019, 7 pages.
Chinese Application No. 201480029128.9, Notice of Reexamination, dated Nov. 6, 2020, received Nov. 19. 2020, 19 pages (partial english summary).

\* cited by examiner

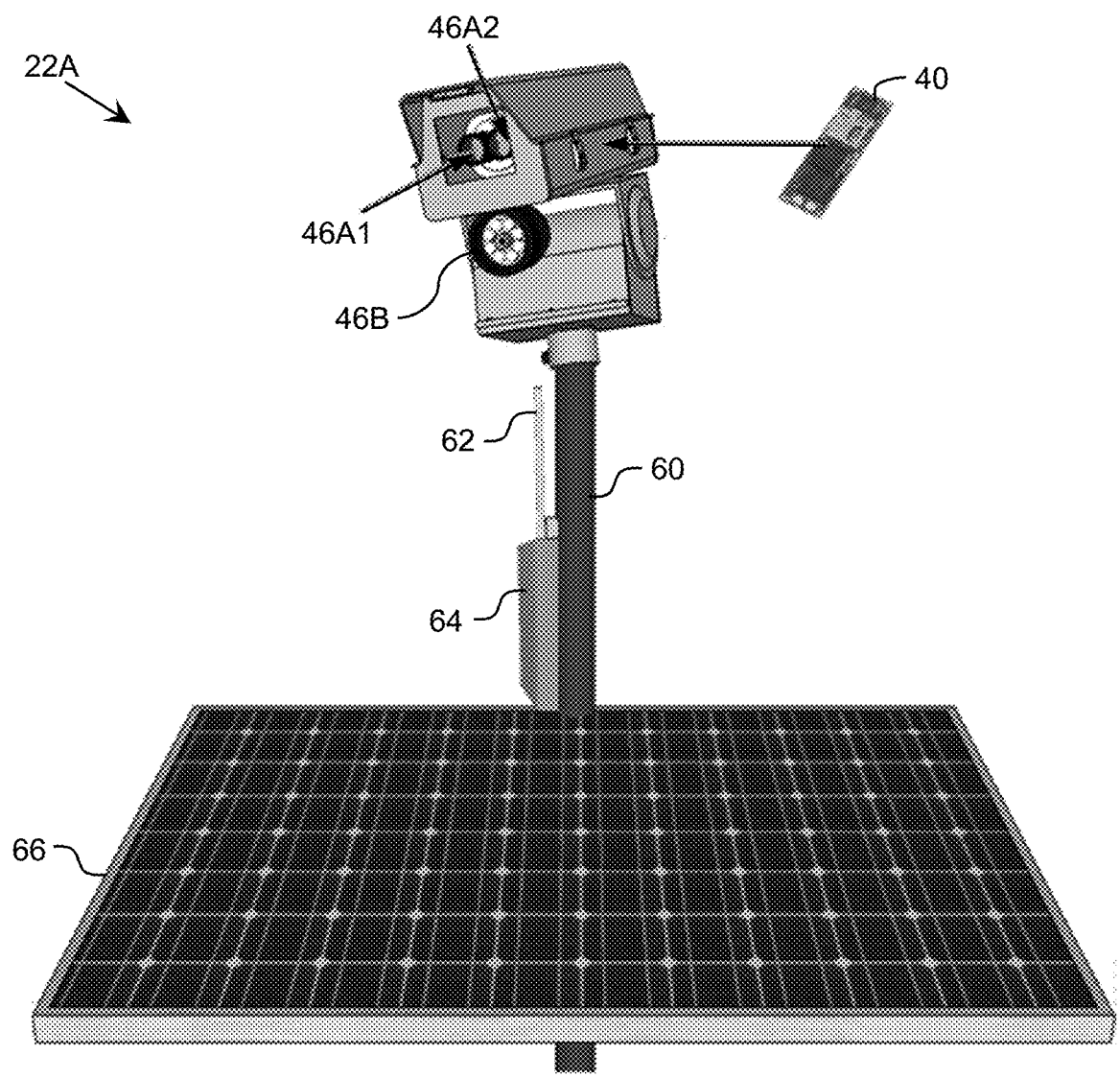

OPERATIONS MONITORING IN AN AREA

REFERENCE TO RELATED APPLICATIONS

The current application is a continuation of U.S. patent application Ser. No. 14/279,385, filed on 16 May 2014, which claims the benefit of U.S. Provisional Application No. 61/855,517, filed on 17 May 2013, each of which is hereby incorporated by reference.

GOVERNMENT LICENSE RIGHTS

This invention was made with government support under contract no. DTRT57-11-C-10041 awarded by the U.S. Department of Transportation. The government has certain rights in the invention.

TECHNICAL FIELD

The disclosure relates generally to monitoring operations in an area, and more particularly, to monitoring an area which includes a restricted area.

BACKGROUND ART

Current approaches for monitoring safe operations and providing warnings of unsafe circumstances in an area, such as an at-grade railroad crossing, where different types of vehicles may operate generally fall into two categories. The first category attempts to exclude vehicles and persons from the grade crossing when a train is or may soon be passing through the crossing. These include simple "crossbuck" signage warning pedestrians and motorists that they are approaching an at-grade railroad crossing, warning lights and bells, and large gates which lower at the approach of a train and raise only after the train has passed.

These approaches are at best only partially successful. One problem is failure of the mechanical and/or electrical systems on occasion, which results in the system giving no warning or activating far too late for any human being to react properly in time. Additionally, human operators often deliberately and systematically evade or ignore the warning systems, either due to inattention, hurry, misjudgment as to the speed of the train and how quickly the tracks can be crossed, and/or the like. There are numerous cases in which a car or truck has been deliberately driven around fully lowered gates and been struck by the train as it attempts to cross the tracks.

Other approaches seek to detect unwanted and dangerous intrusions into the crossing region and signal alerts to appropriate groups or individuals. Besides the intruding vehicle/person themselves, other possible notification targets are the railroad dispatch office, local first responders, and the train operator through an in-locomotive notification system. These approaches generally include intrusive and non-intrusive sensor systems. Intrusive sensors require embedment into the pavement within the crossing. Such devices typically incur periodic failures due to shifting pavement, freeze/thaw cycles, and vehicle loading effects (e.g., heavy trucks). Sensors in this category include inductive loop detectors and magnetic sensors, and depend on the interaction between large metal objects and the electric field produced by the sensor or perturbation of the ambient magnetic field. As such, devices in this class cannot detect humans or any non-metallic objects, and generally cannot detect small metal objects, such as a bicycle or a wheelchair.

Non-intrusive sensors operate in a non-contact manner from a distance that is dependent on the sensor technology, typically measured in feet or tens of feet. Non-intrusive sensors can be further divided into imaging devices and non-imaging devices. Imaging devices, such as a camera, produce a representation of the object detected in the railroad crossing, which can be used by a human to further evaluate the nature of the object and decide a course of action. Non-imaging devices are merely presence detectors that give an indication something is present, and possibly its size. Examples of non-intrusive sensors include: radars (imaging and non-imaging, Doppler and presence sensing); active and passive acoustic and ultrasonic sensors; laser imaging detection and ranging (LIDAR); imaging and non-imaging long wave infrared (LWIR); and visible spectrum video imaging.

Non-imaging systems tend to be subject to high false alarm rates and poor spatial resolution. Visible spectrum imaging systems can be subject to high false alarm rates due to object effects (moving shadows, wind effects, reflections, glint, glare, coloration effects) and do not operate in fog/smoke/fine drizzle due to the scattering of light by the very small particles. Radar imaging systems have poor resolution and difficulty separating objects from background. LWIR systems depend on temperature differential and are of generally lower resolution than visible light systems. These systems operate well in darkness and smoke and fog, but are subject to glare, glint, and background confusion, as are visible spectrum systems. LIDAR (effectively light-based radar) actively scans an area with laser beams, which poses various safety concerns and requires an active scanning system, as does radar, which can break down.

An ultimate approach is to physically separate the crossing, either building a bridge for the train to cross over the road, or a bridge or tunnel for the road to cross over/under the tracks. However, this approach is an extremely expensive and time-consuming process, which is not practical in the vast majority of situations. For example, separating an at-grade crossing in this fashion costs several million dollars per crossing, and there are over 260,000 grade crossings in the United States.

SUMMARY OF THE INVENTION

The inventors recognize several limitations in previous approaches for monitoring an area, such as an at-grade railroad crossing, in which intrusions into a restricted area in the monitored area can lead to serious consequences. To this extent, the inventors provide a solution, which overcomes one or more of the limitations of these previous approaches and/or one or more limitations not described herein.

Aspects of the invention provide an assembly for monitoring an area. The assembly can include two or more cameras sensitive to radiation of distinct wavelength ranges. The fields of view of the cameras can be substantially co-registered at the area to be monitored. The assembly can include a computer system which can process the image data to monitor the area. The computer system can be configured to identify relevant objects present in the area, update tracking information for the relevant objects, and evaluate whether an alert condition is present using the tracking information.

A first aspect of the invention provides a system comprising: a monitoring assembly deployed to monitor an area, wherein the monitoring assembly includes: a plurality of cameras including at least two cameras sensitive to radiation of distinct wavelength ranges, wherein the fields of view of the at least two cameras are substantially co-registered at the area; and a computer system configured to monitor the area by performing a method including: operating the plurality of cameras to substantially concurrently acquire image data of the area; identifying a set of relevant objects in the area using the image data acquired by the plurality of cameras; updating tracking information for each object in the set of relevant objects; and evaluating an alert condition in response to the tracking information for each of the set of relevant objects.

A second aspect of the invention provides a method comprising: acquiring multispectral image data of an area on a computer system of a monitoring assembly including a plurality of cameras including at least two cameras sensitive to radiation of distinct wavelengths; the computer system identifying a set of relevant objects in the area using the multispectral image data; the computer system updating tracking information for each object in the set of relevant objects; the computer system evaluating an alert condition in response to the tracking information for each of the set of relevant objects; and the computer system performing an action response to evaluating a presence of an alert condition.

A third aspect of the invention provides an at-grade railroad crossing comprising: a road intersecting with railroad tracks; and a monitoring assembly deployed to monitor the railroad crossing, wherein the monitoring assembly includes: a first camera sensitive to near infrared and visible radiation; a second camera sensitive to infrared radiation, wherein the fields of view of the first and second cameras are substantially co-registered at the intersection of the road and the railroad tracks; and a computer system configured to monitor the railroad crossing by performing a method including: identifying a set of relevant objects in the area using image data substantially concurrently acquired by the first and second cameras; updating location and tracking information for each object in the set of relevant objects; and evaluating an alert condition using the location and tracking information for each of the set of relevant objects and an amount of time until a train next uses the railroad crossing.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIG. 3 shows another illustrative assembly for monitoring operations in an area according to an embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Embodiments of the invention can provide one or more improvements over prior art approaches for monitoring areas. Illustrative improvements include, for example, multispectral target identification and tracking; multispectral data fusion; calibration and image registration from environmental targets; situation analysis based on multiple image history; and/or the like. In an embodiment, the monitored area includes a restricted area. The restricted area can comprise an area within which objects (e.g., people, vehicles, etc.) are not allowed to enter or the restricted area can be an area that can be entered or occupied by various objects present in the area at certain times and/or in certain circumstances.

As indicated above, aspects of the invention provide an assembly for monitoring an area. The assembly can include two or more cameras sensitive to radiation of distinct wavelength ranges. The fields of view of the cameras can be substantially co-registered at the area to be monitored. The assembly can include a computer system which can process the image data to monitor the area. The computer system can be configured to identify relevant objects present in the area, update tracking information for the relevant objects, and evaluate whether an alert condition is present using the tracking information. As used herein, unless otherwise noted, the term "set" means one or more (i.e., at least one) and the phrase "any solution" means any now known or later developed solution.

Figure 1:
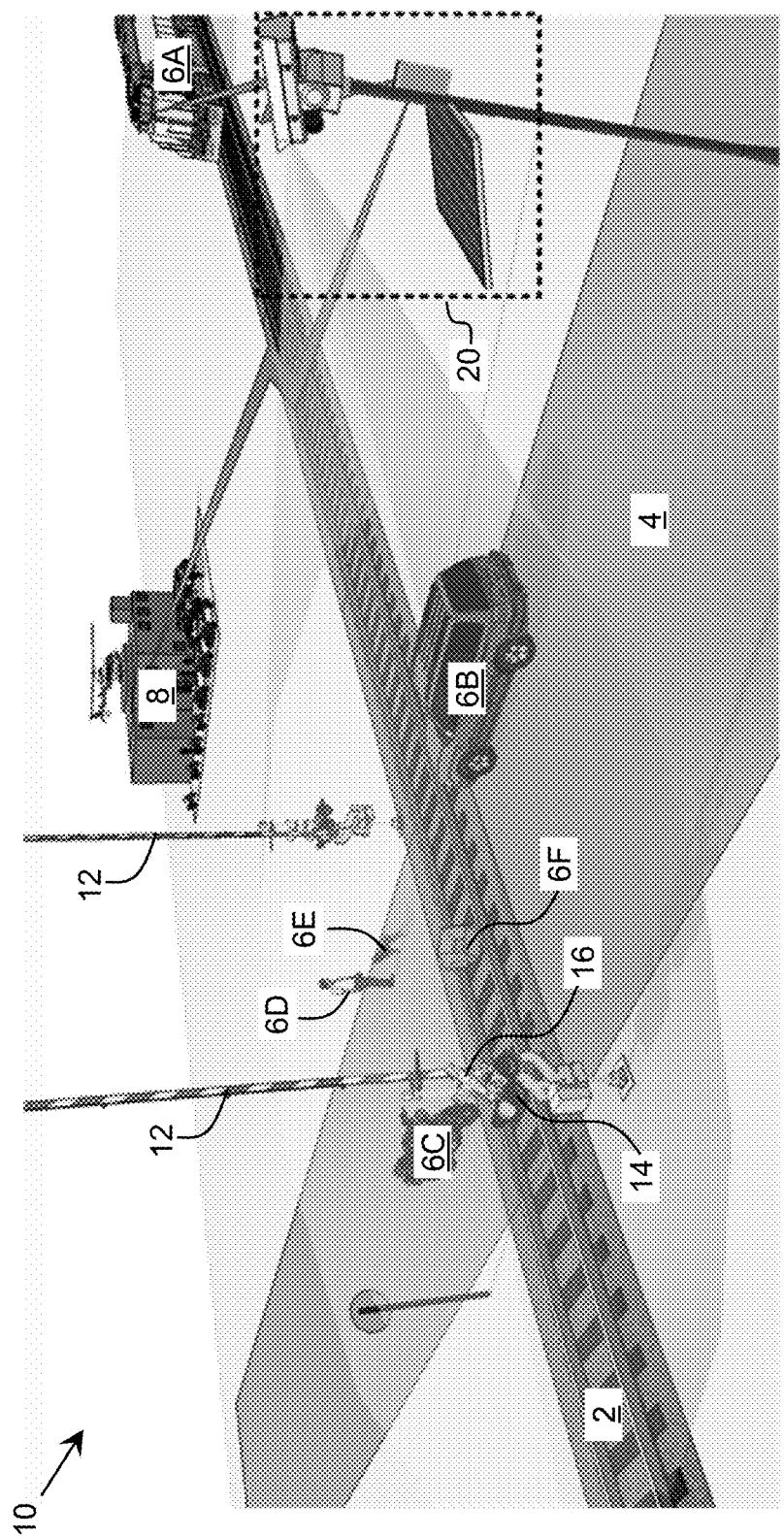
FIG. 1 shows a hypothetical image of an illustrative at-grade railroad crossing according to an embodiment.

Further aspects of the invention are described herein using an at-grade railroad crossing as an illustrative area within which conditions are monitored. To this extent, FIG. 1 shows a hypothetical image of an illustrative at-grade railroad crossing 10 according to an embodiment. The railroad crossing 10 comprises a location at which a railroad track or tracks 2 intersect with a road 4 at the same grade (i.e., not above on a bridge or below in a tunnel). An illustrative railroad crossing 10 includes visual and audible warnings for pedestrians and vehicles on the road 4. These can include gates 12, lights and bells 14, a crossbuck sign 16, and/or the like. Some railroad crossings 10 may only include a subset of these items, such as only the crossbuck sign 16 and lights 14, or even only the crossbuck sign 16.

In any event, various objects may be present in and/or travel through the railroad crossing 10. Illustrative objects include: a train 6A, a vehicle 6B, a motorcycle 6C, a human 6D, an animal 6E, and debris 6F. When a train 6A is passing through the crossing 10, any other object 6B-6F present in the crossing may be struck by the train 6A. To this extent, a region of the crossing 10 defined by the tracks 2 (and some distance on either side thereof) becomes a restricted area as a train 6A approaches the crossing. To ensure the safety of individuals and pets located near the crossing as well as the safe passage of the train 6A, it is highly desirable that the restricted area be free of any objects 6B-6F. However, as the cost to stop a train 6A, if it is even possible, can be extremely high (five thousand dollars or more), only specific types of objects 6B-6F are considered to be of sufficient import to stop the train 6A prior to its entering the railroad crossing 10. In general, such objects include: humans 6D, as a person is virtually certain to be killed if struck by a train 6A, it is highly desirable to stop the train 6A if at all possible prior to a collision; motor vehicles 6B, 6C, as humans may be present in such vehicles 6B, 6C and many of such vehicles 6B, 6C have sufficient size to potentially cause a derailment if struck; and suspicious or dangerous objects. Suspicious or dangerous objects can include objects deliberately placed on the tracks 2, which are generally assumed to be placed with malicious intent, and accidentally placed objects, which appear to have a sufficient size and mass to pose a derailment threat should a train 6A collide with the object. To this extent, objects such as an empty cardboard box 6F, paper, etc., are generally ignored, but large pieces of steel fallen from a truck's cargo, or a box apparently deliberately placed on the tracks 2 with unknown contents may be justification for stopping a train 6A or inspection and removal prior to a train 6A using the crossing 10.

As illustrated, the railroad crossing 10 includes a system 20 for monitoring the railroad crossing 10 and the immediate surroundings. The system 20 can be a self-contained system, which includes one or more cameras and a computer system capable of processing the image data to, for example: automatically discriminate between various types of objects 6A-6F that may be present in the area; track a history of the movement of objects 6A-6F within the area; make determinations of potential danger based on the history, identification of the object(s) 6A-6F, nearness of an approaching train 6A, and/or the like; etc. In response to determining a potentially dangerous condition is present in the railroad crossing 10, the system 20 can perform one or more actions including, for example: transmitting a warning and/or summary of the situation to a remote location 8 (e.g., first responders, train operations group, and/or the like); transmitting an alert and/or instructions to an engineer of the train 6A; activating local alert devices, such as the gates 12, the lights and bells 14, and/or other warning devices that can be added to the railroad crossing 10; and/or the like.

Figure 2:
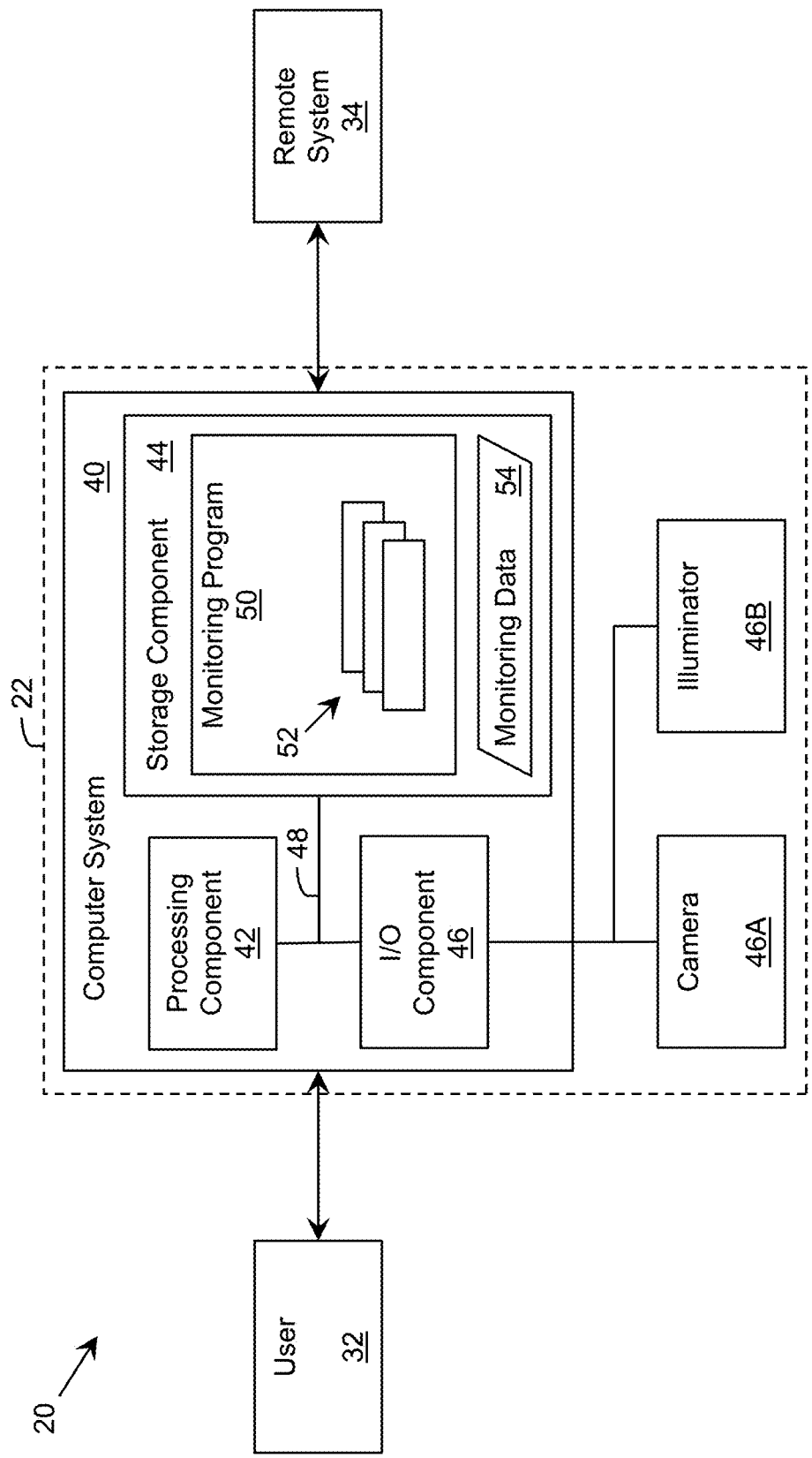
FIG. 2 shows an illustrative system for monitoring operations in an area according to an embodiment.
Figure 4A:
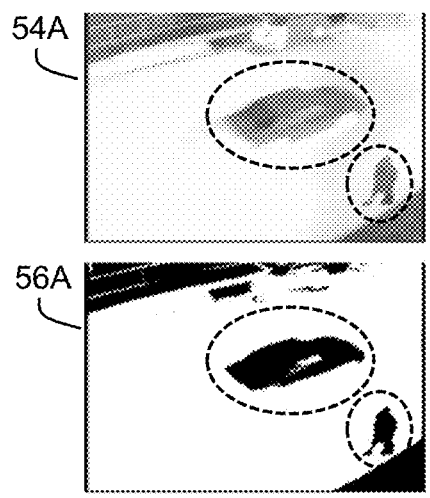
FIGS. 4A-4D show illustrative examples of multispectral image data, which can be utilized in an embodiment.
Figure 4B:
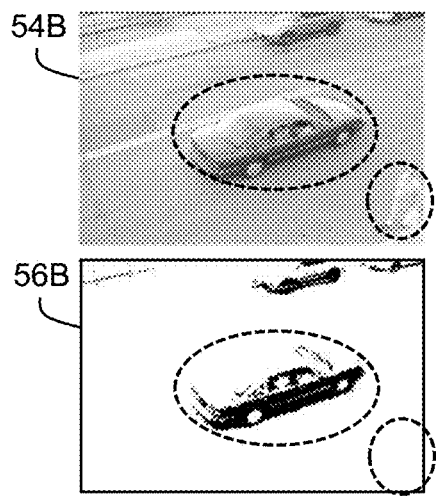
Figure 4C:
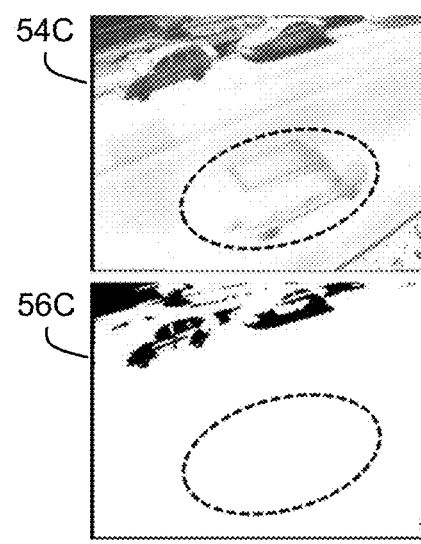
Figure 4D:
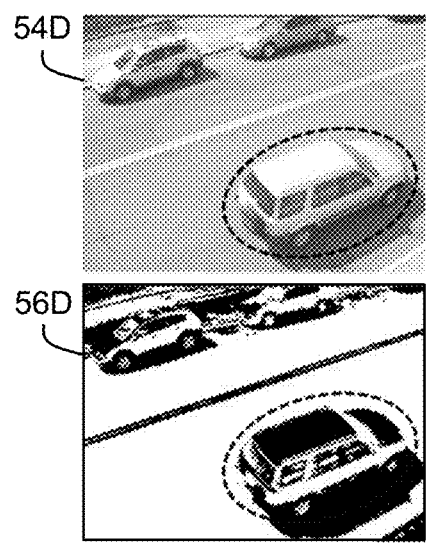

FIG. 2 shows an illustrative system 20 for monitoring operations in an area, such as a railroad crossing 10 (FIG. 1), according to an embodiment. To this extent, the system 20 includes a computer system 40 that can perform a process described herein in order to monitor operations in the area. In particular, the computer system 40 is shown including a monitoring program 50, which makes the computer system 40 operable to monitor the area by performing a process described herein.

The computer system 40 is shown including a processing component 42 (e.g., one or more processors), a storage component 44 (e.g., a storage hierarchy), an input/output (I/O) component 46 (e.g., one or more I/O interfaces and/or devices), and a communications pathway 48. In general, the processing component 42 executes program code, such as the monitoring program 50, which is at least partially fixed in storage component 44. While executing program code, the processing component 42 can process data, which can result in reading and/or writing transformed data from/to the storage component 44 and/or the I/O component 46 for further processing. The pathway 48 provides a communications link between each of the components in the computer system 40. The I/O component 46 can comprise one or more human I/O devices, which enable a human user 32 to interact with the computer system 40 and/or one or more communications devices to enable a system user, such as a remote system 34, to communicate with the computer system 40 using any type of communications link. To this extent, the monitoring program 50 can manage a set of interfaces (e.g., graphical user interface(s), application program interface, and/or the like) that enable human users 32 and/or system users 34 to interact with the monitoring program 50. Furthermore, the monitoring program 50 can manage (e.g., store, retrieve, create, manipulate, organize, present, etc.) the data, such as monitoring data 54, using any solution.

In any event, the computer system 40 can comprise one or more general purpose computing articles of manufacture (e.g., computing devices) capable of executing program code, such as the monitoring program 50, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the monitoring program 50 can be embodied as any combination of system software and/or application software.

Furthermore, the monitoring program 50 can be implemented using a set of modules 52. In this case, a module 52 can enable the computer system 40 to perform a set of tasks used by the monitoring program 50, and can be separately developed and/or implemented apart from other portions of the monitoring program 50. As used herein, the term "component" means any configuration of hardware, with or without software, which implements the functionality described in conjunction therewith using any solution, while the term "module" means program code that enables a computer system 40 to implement the actions described in conjunction therewith using any solution. When fixed in a storage component 44 of a computer system 40 that includes a processing component 42, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 40.

When the computer system 40 comprises multiple computing devices, each computing device can have only a portion of the monitoring program 50 fixed thereon (e.g., one or more modules 52). However, it is understood that the computer system 40 and the monitoring program 50 are only representative of various possible equivalent computer systems that may perform a process described herein. To this extent, in other embodiments, the functionality provided by the computer system 40 and the monitoring program 50 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 40 includes multiple computing devices, the computing devices can communicate over any type of communications link. Furthermore, while performing a process described herein, the computer system 40 can communicate with one or more other computer systems, such as the remote system 34, using any type of communications link. In either case, the communications link can comprise any combination of various types of optical fiber, wired, and/or wireless links; comprise any combination of one or more types of networks; and/or utilize any combination of various types of transmission techniques and protocols.

In an illustrative embodiment, the computer system 40 receives monitoring data 54 from one or more cameras 46A. The camera(s) 46A can be of any type suitable for operation in the intended operating environment (e.g., a railroad crossing) and have sufficient resolution and sensitivity to enable the computer system 40 to perform the desired image processing as described herein. In an embodiment, the camera(s) 46A can include one or more sensing modalities, such as visible light, near-infrared, infrared (e.g., mid-wave infrared, long-wave infrared, or both, also referred to as thermal infrared), or the like. The computer system 40 can perform multispectral fusion operations to assist in making a determination between normal and abnormal events in the area. Regardless, the computer system 40 can receive monitoring data 54 from the camera(s) 46A and process the data to monitor operations in the area. To this extent, the computer system 40 can implement any of a number of smart video analysis methods including, for example, those described in U.S. Pat. Nos. 7,355,508, 8,188,430, and 8,335, 606, each of which is hereby incorporated by reference. In an embodiment, the computer system 40 is configured to perform a time-based discrimination and event understanding, observing a sequence of images and derive an understanding from changes in the view over time, and/or the like.

In some operating environments, there may simultaneously be too little and too much light within the field of view of a camera 46A. For example, during night operations at a railroad crossing 10 (FIG. 1), powerful headlights of locomotives, approaching vehicles, or other powerful sources of light may introduce considerable glare into the image, which can wash out portions of the image, while overall lighting during the night may be very low. In an embodiment, the computer system 40 can operate one or more illuminators 46B to provide sufficient light to an area being monitored. For example, the computer system 40 can determine that the area being monitored lacks sufficient light (e.g., using previously acquired image data, a light sensing device, and/or the like) and can activate one or more illuminators 46B in response. Similarly, the computer system 40 can determine when the area being monitored has sufficient ambient light and can turn off the one or more illuminators 46B. An illuminator 46B can emit visible or other light into the field of view of the camera 46A to provide sufficient lighting for the camera 46A to acquire image data suitable for processing by the computer system 40. In a more particular embodiment, an illuminator 46B comprises a near-infrared emitting illuminator (e.g., a light emitting diode-based illuminator), which can emit acceptable levels of near-infrared radiation up to approximately 450 feet (approximately 137 meters) for a near-infrared sensitive camera 46A. Furthermore, when two or more illuminators 46B are used in concert, the distance can readily exceed 600 feet (183 meters).

To address too much light, e.g., from a locomotive or the like, any of several approaches can be utilized. For example, if the light source is fixed in a portion of the image which is not relevant to the analysis (e.g., distant lights), the portion of the field of view of the camera 46A can be physically blacked out. To address situations where the light source is too close to a relevant portion of the field of view, the camera 46A can include a filter, which can be selected to reduce or remove the peak wavelengths of light radiated by the interfering light sources. Use of such a filter can drastically reduce glare and allow the computer system 40 to clearly identify targets in the image data acquired by the camera 46A, which would otherwise have been obscured.

In an illustrative embodiment, the computer system 40, camera 46A, and illuminator 46B are configured to be deployed together as a single monitoring assembly 22. For example, the assembly 22 can comprise a single enclosure housing all of the components 40, 46A, 46B, or a mounting system on which one or more enclosures can be fixed. The location of the assembly 22 can be selected to enable the camera 46A to have a desired field of view of the area to be monitored.

FIG. 3 shows another illustrative assembly 22A for monitoring operations in an area according to an embodiment. The assembly 22A can include a housing holding a pair of cameras 46A1, 46A2, as well as a computer system 40 and other electronic support components. For example, the computer system 40 can comprise a low-power video processing system. In an embodiment, the computer system 40 is a computer-on-module (COM), such as an Overo COM offered by Gumstix, Inc. The assembly 22A also is shown including an illuminator 46B, which can be operated by the computer system 40, when necessary, to provide sufficient light of the requisite spectral bands for the cameras 46A1, 46A2 to acquire image data capable of being processed by the computer system 40 up to at least a required distance. While not shown, it is understood that the housing can include various other components, which can be operated by the computer system 40. For example, the housing can include environmental controls, such as heating and cooling, for a window through which the cameras 46A1, 46A2 acquire image data.

In an embodiment, the cameras 46A1, 46A2 are sensitive to distinct classes of radiation. For example, a first camera, such as camera 46A1, can be sensitive to visible/near infrared radiation, while the other camera 46A2 is sensitive to thermal infrared radiation. The two cameras 46A1, 46A2 can be mounted and provided with optics such that their fields of view are substantially co-registered (e.g., greater than ninety-five percent) at a range to the area of interest (e.g., the railroad crossing). In an embodiment, the illuminator 46B comprises a near infrared illuminator (e.g., a near infrared light emitting diode-based illuminator), which can be operated by the computer system 40 to provide near infrared illumination into the area of interest to enable all-lighting operation of the visible/near infrared camera 46A1.

The assembly 22A is shown including various other components. For example, the assembly 22A is shown including a transceiver 60 and an antenna 62, which can enable wireless communications between the assembly 22A and a remote system 34 (FIG. 1) and/or a locomotive of a train 6A (FIG. 1). Such communications can include receiving software updates (e.g., modifications of the target region of interest, new parameters for detection of alerts, and/or the like) from the remote system 34, receiving data regarding the monitored area or one or more future events that will occur in the monitored area (e.g., an amount of time before a train will be using a crossing), and/or the like. Furthermore, when the computer system 40 determines a presence of one or more alert conditions, the computer system 40 can perform one or more actions, such as communicating data regarding the alert condition to a remote system 34, an approaching train 6A, activate a local alarm (e.g., a light, a horn, and/or the like) to warn any people that may be in danger, and/or the like. While shown mounted separate from the computer system 40 and the cameras 46A1, 46A2, it is understood that the transceiver 60 could be mounted in the same enclosure as the computer system 40 and/or the cameras 46A1, 46A2. It is understood that utilization of a wireless communications solution is only illustrative and any communications solution, including a wired solution, can be utilized.

The assembly 22A can be mounted on a pole 64 of a sufficient height (e.g., approximately forty feet (approximately twelve meters) or higher) to provide a sufficient view of the target area (e.g., the railroad crossing and the surrounding area) for the cameras 46A1, 46A2. The assembly 22A can be mounted in a manner that allows the devices (e.g., the cameras 46A1, 46A2 and/or the illuminator 46B) to be rotated and inclined to an angle appropriate to properly center the fields of view of the cameras 46A1, 46A2 on the target area. Such a mounting can use any solution and can be permanent or temporary. Furthermore, the various components can receive power through a wired connection to a power grid. In an embodiment, the assembly 22A includes a local power source, such as a solar panel 66, which can be configured to provide sufficient power to enable the operation of the various electronic devices of the assembly 22A without connection to a power grid. In this case, the assembly 22A also can include sufficient power storage (e.g., a battery) to enable operations when the local power source does not generate sufficient power (e.g., no sunlight).

It is understood that various applications may desire to minimize a size and/or weight of equipment and enclosures mounted at a top of the pole 64. To this extent, an embodiment of the assembly 22A can include only the cameras 46A1, 46A2 and illuminator 46B at a high vantage point, with the remaining components located lower in one or more separate enclosures. In this case, the various components located closer to the ground can be more readily serviced and/or upgraded without requiring access to a top of the pole 64.

As described herein, the assembly 22A can include multiple cameras 46A1, 46A2, which provide multispectral image data of an area being monitored, such as the railroad crossing 10 shown in FIG. 1. FIGS. 4A-4D show illustrative examples of multispectral image data, which can be utilized in an embodiment. In this case, the image data includes thermal infrared images 54A, 54C and visible/NIR images 54B, 54D. Images 54A, 54B were acquired for the same area at substantially the same time (e.g., within half second or less), while images 54C, 54D were similarly acquired for the same area at substantially the same time.

The computer system 40 (FIG. 2) can receive the images 54A-54D and process the images 54A-54D as part of monitoring the area. The computer system 40 can perform any combination of various types of image processing. For example, the computer system 40 can perform background processing and subtraction on each of the images 54A-54D. Illustrative monitoring data 56A-56D generated after such processing for images 54A-54D is shown in conjunction with the respective images 54A-54D. As can be seen, each image 54A-54D includes at least one vehicle and person present in the imaged area, which are typical targets that may be imaged at the railroad crossing 10.

A significant challenge in much background subtraction processing performed by a computer system 40 is determining where background and foreground intersect. Typically, many algorithms implemented by the computer system 40 can make such a determination based on contrast. While human visual processing can readily identify the car in the visible/NIR image 54B, making such an identification with the computer system 40 performing automated image processing is difficult without expending an extremely large amount of available processing. In particular, the similar colors and low contrast conspire to make the upper portion of the car effectively disappear in the view of most analysis algorithms available for implementation on various types of computer systems 40, which can be located remotely, operate on low power, and/or the like.

As most algorithms implemented by a computer system 40 categorize targets by recognizing shapes in the processed image data 56A-56D, the computer system 40 can more readily recognize the imaged car using the processed image data 56A as opposed to the processed image data 56B, where the shape remaining after processing is more broken and disjoint. Furthermore, the person in the image data is readily identifiable in the processed image data 56A, but is entirely absent from the processed image data 56B. In light of the above, the infrared image 54A provides image data more suitable for identifying targets present in the area. However, when considering the images 54C, 54D, which correspond to the same area, but on a different day, the processed image data 56D corresponding to the visible/NIR image 54D enables the computer system 40 to identify the vehicle that is present in the images 54C, 54D, whereas the evidence of the vehicle is entirely absent from the processed image data 56C for the infrared image 54C.

These results illustrate the differences in functionality provided by use of multispectral image data. In the first set of images 54A, 54B, the color of the vehicle was close the color of the pavement making discerning the vehicle from the background more difficult for the visible/NIR image 54B. However, the body of the vehicle was at a generally lower temperature than the pavement, and therefore could be readily identified in the processed image data 56A of the infrared image 54A. Conversely, hot pavement and a hot vehicle roof present in the infrared image 54C cause evidence of the vehicle to virtually disappear in the processed image data 56C, while the vehicle remains readily identified in the processed image data 56D for the visible/NIR image 54D.

The computer system 40 can leverage other differences between the images 54A-54D acquired for different spectra. For example, shadows can be difficult for a computer system 40 to separate from objects, especially in the visible light spectrum. However, shadows are often smaller or nonexistent in the infrared spectrum (see, e.g., images 54C, 54D). Where shadows appear in infrared image data, they are likely due to a vehicle being parked for a significant amount of time, after which the shadow can cause a significant cooling effect on the shaded pavement. Temperature differences also can allow the computer system 40 to use a combination of visible/NIR and infrared to recognize living or motorized objects versus nonliving, inert objects. For example, all living things in the size range of interest will be at a body temperature usually significantly greater than that of the current environment, and nearly always significantly different, especially taking emissivity of various materials into account. Vehicles also generate large amounts of heat which will tend to separate them from the background in infrared image data.

Figure 5:
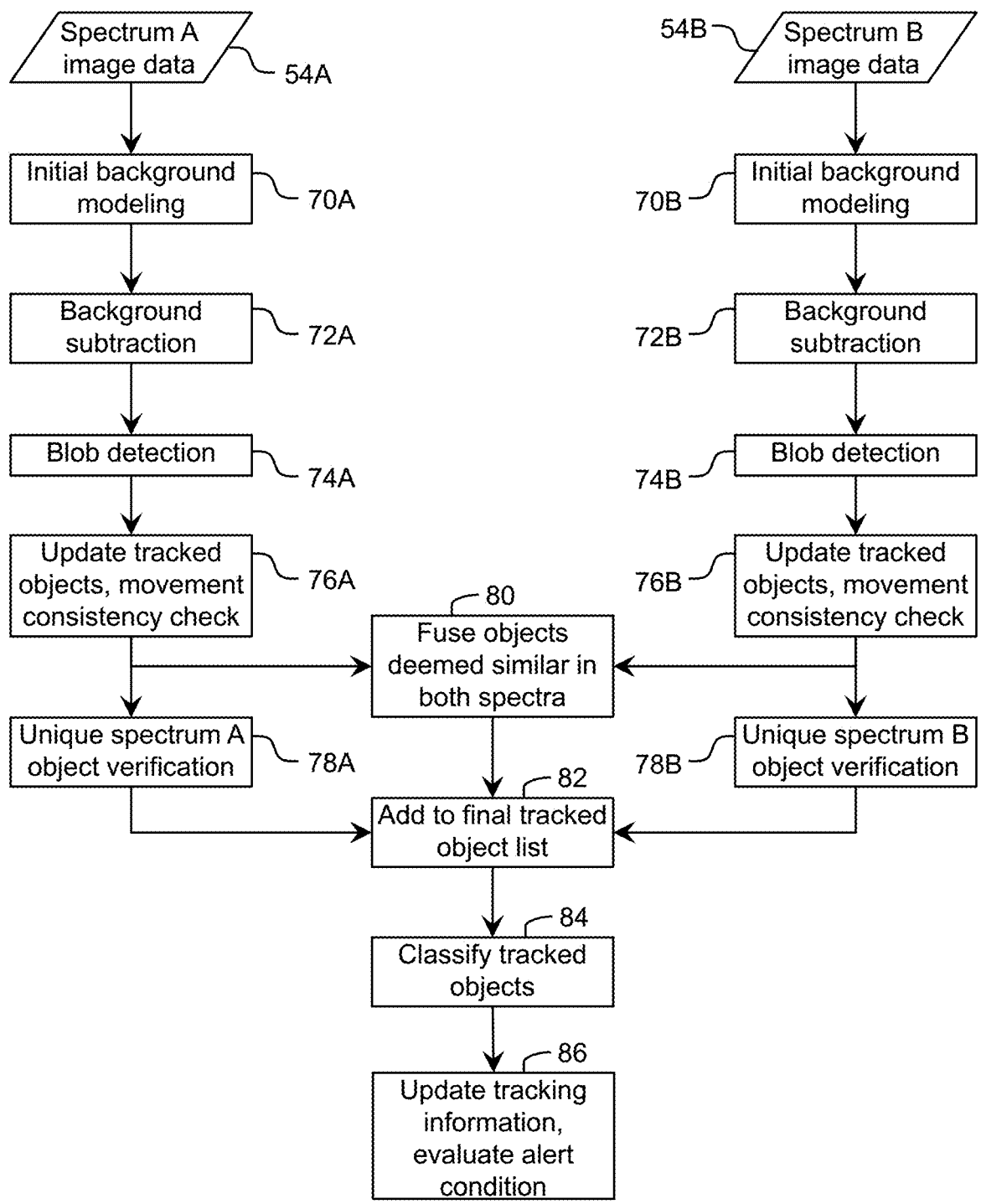
FIG. 5 shows an illustrative process for monitoring an area using multispectral image data according to an embodiment.

FIG. 5 shows an illustrative process for monitoring an area using multispectral image data, which can be implemented by the computer system 40 (FIG. 2) in an embodiment. Initially, the computer system 40 can obtain image data 54A, 54B for the area, which was acquired by cameras sensitive to unique spectra (e.g., Spectrum A and Spectrum B). For example, the spectra can include the visible/NIR spectrum and the thermal infrared (e.g., long wavelength infrared) spectrum. While the spectra can be non-overlapping, it is understood that the image data 54A, 54B can be for partially overlapping spectra. Furthermore, while two spectra are shown and described herein, it is understood that image data corresponding to any number of two or more spectra can be utilized. Still further, while infrared and visible/NIR spectra are described herein, a combination of two or more of any spectra can be utilized. Additional spectra can include for example, visible, ultraviolet, near-infrared, mid-infrared, thermal infrared, subsets or combinations thereof, and/or the like.

In an embodiment, the image data 54A, 54B is substantially concurrently acquired by the cameras. Initially, the computer system 40 can separately process the image data 54A, 54B, which can be performed by the computer system 40 in parallel. While the processing actions shown and described for each spectrum of image data 54A, 54B are the same, it is understood that details of the implementation of each processing act by the computer system 40 can be significantly different for image data 54A, 54B of different spectra. Such implementations of each of the processing actions described herein are known in the art, e.g., as described in the patents, previously incorporated by reference. Furthermore, it is understood that the computer system 40 can implement alternative and/or additional actions to identify target objects within the image data 54A, 54B of a spectrum. The process shown and described herein is only illustrative.

Regardless, in actions 70A, 70B, the computer system 40 can perform initial background modeling on the image data 54A, 54B using any solution. The initial background modeling can determine what is and is not background in the image data 54A, 54B. In actions 72A, 72B, the computer system 40 can perform background subtraction on the image data 54A, 54B to remove all elements from the image data 54A, 54B that correspond to the background. In actions 74A, 74B, the computer system 40 can aggregate the remainder of the foreground into blobs (objects) using a blob detection solution. The blob detection solution can be configured to reject objects in the foreground, which are below a minimum size as such objects are likely to be spurious artifacts in the image data. In actions 76A, 76B, the computer system 40 can compare the identified blobs to previously defined and tracked objects and update information regarding the tracked objects matching a blob accordingly. Furthermore, the computer system 40 can accept or reject objects using a consistency of movement check. In this case, the computer system 40 can detect and eliminate many spurious objects (e.g., those identified due to brief shadows or reflections). Similarly, the computer system 40 can assemble multiple "objects" (e.g., due to difficult to identify object borders) into a single object due to common movement of these objects over a sufficient period of time and/or distance.

Subsequently, the computer system 40 can confirm the objects independently identified in one or more of the image data 54A, 54B. For example, in action 80, the computer system 40 can fuse (combine) the objects found in both of the image data 54A, 54B into a single object, thereby providing a high-confidence, accurate tracking of known objects. The computer system 40 can implement any solution for determining that objects are sufficiently similar to correspond to the same object. For example, as discussed herein, when the fields of view for the image data 54A, 54B are substantially co-registered, the computer system 40 can identify objects occupying substantially the same location as being the same object. Furthermore, in actions 78A, 78B, the computer system 40 can verify any objects unique to only one spectrum. For example, the computer system 40 can perform outline or pattern matching, evaluate whether the object exhibits consistent movement in the corresponding spectrum image data, and/or the like, to verify that while the object is not visible in the image data of the other spectrum, it does in fact represent an actual object and not an illusion of an object.

In action 82, the computer system 40 can add and/or renew all verified objects to a tracked object list. Furthermore, in action 84, the computer system 40 can analyze the list of tracked objects in more detail to identify and/or classify the targets. For example, the computer system 40 can take into account any combination of one or more relevant parameters, such as an overall size of the object, a dimension ratio, speed and vector of movement of the object, and/or the like. Once the computer system 40 has classified the tracked objects, in action 86, the computer system 40 can evaluate the overall situation in the monitored area. For example, using the tracking data of an object, the computer system 40 can determine whether any object of interest is present in a restricted zone (e.g., on or in the immediate vicinity of the railroad tracks), how long the object has been present in the restricted zone, whether the object is moving through or out of the restricted zone, and/or the like. Furthermore, the computer system 40 can consider other factors, such as whether a critical event will occur soon (e.g., a train is approaching the crossing), weather, traffic patterns, and/or the like. Depending on the results of the evaluation, the computer system 40 can determine whether an alert condition is present in the monitored area, and perform one or more actions in response to determining that an alert condition is present.

In various monitoring applications, including the railroad crossing application described herein, determination of whether a target is of interest includes determining whether a size of the target falls within an overall size range for relevant targets. For example, small animals, such as rabbits, rats, and/or the like, may be present in a restricted zone but are not relevant targets for the railroad crossing application. In an embodiment, the computer system 40 can ignore these small animals while any human targets are recognized as being relevant. Using two-dimensional image data, determining the actual size of the object can depend on knowing a precise distance to the object. In particular, when the precise distance to the object is known, the computer system 40 can derive a size of the object from the number of pixels the target occupies in the image data 54A, 54B. Without knowing the distance, the number of pixels provides little information regarding the size of the object, which may be very close or very far away.

In an embodiment, the computer system 40 comprises a baseline for measurement of objects present in the monitored area. For example, the computer system 40 can be calibrated using custom targets spaced across the field of view, each having well-known dimensions. The computer system 40 can process image data acquired with the targets present to perform three-dimensional registration of all of the pixels across the field of view.

Figure 6:
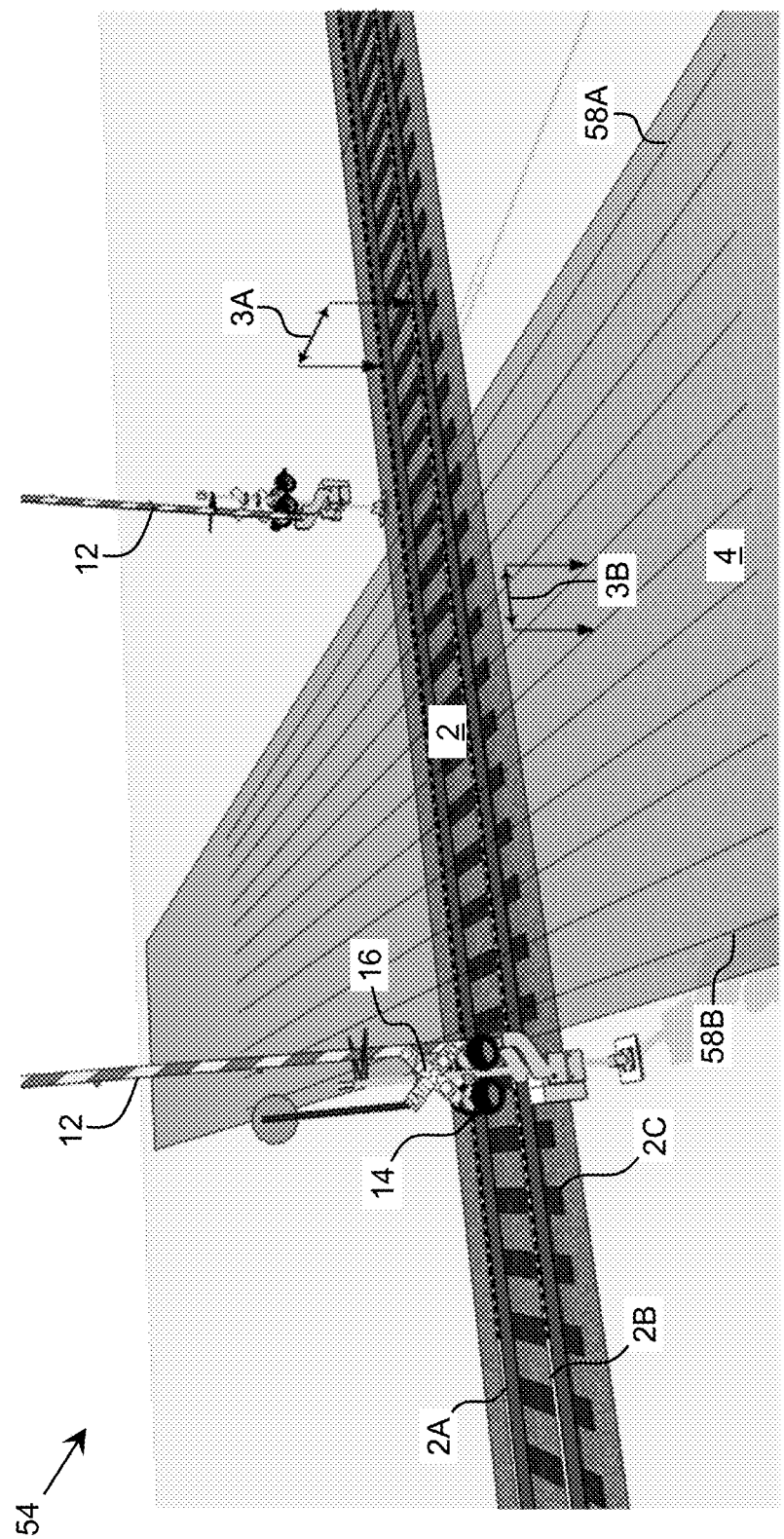
FIG. 6 shows a simulated image of an illustrative at-grade railroad crossing according to an embodiment.

In another embodiment, the computer system 40 can self-calibrate and register pixels in the image data using available cues (e.g., ambient features) present in the monitored area. To this extent, FIG. 6 shows a simulated image 54 of an illustrative at-grade railroad crossing according to an embodiment. For example, the image 54 can correspond to an image acquired by a camera deployed as part of the monitoring system 20 at the railroad crossing 10 shown in FIG. 1. The image 54 does not include any targets, but does include various static features, such as the tracks 2, the road 4, the gates 12, the lights 14, the crossbuck sign 16, and/or the like.

When present and in use, railroad tracks 2 have highly standardized dimensions, which are maintained to considerable precision in order to allow for the safe travel of trains. In general, tracks 2 include at least two rails 2A, 2B, which are supported by a series of ties 2C and are fastened such that they are located a fixed distance 3 apart. In the United States, this distance 3A is generally four feet, eight and one-half inches (approximately 1.44 meters), and is maintained to a variation of less than approximately 0.5 inches (approximately 1.3 centimeters). Should the rails 2A, 2B have a higher variance, a danger of train derailment due to a mismatch of rail gauge and wheel-to-wheel dimensions on the train increases. Similarly, the ties 2C typically have standard sizes and are spaced at a fixed distance from one another. For example, in the United States, a typical tie 2C measures approximately 8.5 feet long by nine inches wide (approximately 2.6 meters by 22.9 centimeters), has a thickness of approximately seven inches (approximately 17.8 centimeters) and is spaced from adjacent ties by approximately twenty-one inches (approximately 53.3 centimeters). The typical geometry of the various components 2A-2C of the track 2 means that the ties 2C are at right angles to the rails 2A, 2B.

The rail components 2A-2C visible in the image 54 provide the computer system 40 with multiple geometric references with which to create an accurate registration map (e.g., a two-dimensional projection of a three-dimensional model) of the imaged field of view. For example, the computer system 40 can use the distance between the visible tops of the rails 2A, 2B in the image 54 and the known separation of the rails 2A, 2B to create the registration map. Furthermore, the computer system 40 can use the ties 2C as guidelines to generate a grid of parallel lines 58A, 58B, which will be separate from each other by the center-to-center spacing distance 3B of the ties 2C. Furthermore, the computer system 40 can use other non-rail features, which may have known measurements, such as the crossbuck sign 16, the road 4, the gates 12, the lights 14, and/or the like, to create the registration map. In an embodiment, when deployed, the mounting height of the camera 46A (FIG. 2) of the monitoring system 20 is measured and a horizontal distance from the camera 46A to a visible location in the area 10, such as a selected tie 2C is measured. Furthermore, measurement data for one or more static features present in the image 54 (e.g., actual spacing between two or more ties 2C, markings on the road 4, and/or the like) can be obtained. Using these measurements and the known geometric references provided by the track components 2A-2C, the computer system 40 can derive a detailed and accurate assessment of the distances to, and visibility of, key locations throughout the field of view. However, after calibration, these landmarks no longer need to be visible within the image data (e.g., can be removed, covered by snow, etc.) as their locations have been virtualized in the registration map. With such knowledge, the computer system 40 can readily determine the three-dimensional equivalence of various locations in the two-dimensional image data with or without various landmarks being visible in the image data.

Furthermore, while monitoring the area 10 and one or more objects present in the area 10, the computer system 40 can match a location (e.g., a location at which the object touches the ground) of the object to the key locations and can determine precise coordinates of the object using the registration map. Using the coordinates and pixel extent in the image 54, the computer system 40 can determine a size and orientation of the object. Furthermore, the computer system 40 can use additional information to verify location and orientation of an object. To this extent, the computer system 40 can analyze a relationship of the object with one or more static objects present in the field of view. For example, the vehicle 6B shown in FIG. 1 is partially blocking a view of at least one of the rails of the tracks 2. As a result, the computer system 40 can determine that the vehicle 6B has not yet passed both rails of the tracks 2. Similarly, the computer system 40 can use other permanent objects or features in the field of view of a monitored area 10 to provide additional calibration and position references.

As described herein, any target object's distance can be determined by the point or points on the ground plane (e.g., the road 4, the tracks 2, and/or the like) at which the object touches and projecting upward into the calibrated three-dimensional space of the registration map previously calculated by the computer system 40. It is understood that various objects, such as blowing debris, birds, and/or the like, may be present within the image 54, but not be located on the ground. In an embodiment, the computer system 40 can eliminate such objects from consideration when processing the image data, e.g., due to characteristic movement of the object, the relationship of the object to other objects in the field of view, and/or the like.

In a monitoring application, such as the railroad crossing application described herein, a basic function of the monitoring system 20 is to identify when an alert condition (e.g., a potentially dangerous circumstance) exists within the monitored area 10. However, for many applications, it is equally important for the computer system 40 to accurately determine when an alert condition does not exist so that unnecessary actions are not taken in response to circumstances that did not merit a response. As described herein, the computer system 40 can accurately determine whether an object is present in a restricted area (e.g., within the grade crossing region) or outside of the area and determine an alert condition accordingly.

In addition, as described herein, the computer system 40 can be configured to discriminate between objects (e.g., a vehicle, a human, and/or the like) present in the restricted area which correspond to an alert condition and warrant actions being taken in response thereto, and objects (e.g., small wildlife) which do not correspond to an alert condition and do not require any action(s). In an embodiment, the computer system 40 can use the size and shape of the object and tracked behavior of the object (e.g., walking) to classify the object as being relevant to an alert condition or not relevant to an alert condition.

Furthermore, the computer system 40 can use information provided by the use of multispectral image data to further assist in classifying the object. For example, near-infrared image data can be obtained in very low-light conditions and can be enhanced using one or more near infrared illuminators. The use of near infrared illumination is invisible to the human eye, and therefore does not provide a distraction or glare source for drivers. Furthermore, near infrared imagery can penetrate some forms of obscuration significantly better than visible light imagery. Additionally, thermal infrared imagery does not require illumination, and can penetrate smoke, fog, precipitation, and/or the like. Thermal infrared image data also provides information regarding temperature differences between different objects in the image data. The computer system 40 can use the temperature data to distinguish between operating vehicles and living creatures, which generate significant amounts of heat, and other natural objects, which generally do not generate heat. Using a combination of image data from different spectra, the computer system 40 can accurately discriminate between likely types of target objects, while ensuring an ability to monitor the entire area 10 and all potential target objects regardless of time of day, current weather conditions, and/or the like.

Furthermore, the computer system 40 can use tracking data for an object to discriminate between objects which have similar appearances but different threat levels. For example, using the box 6F shown in FIG. 1 as an example, using tracking data for the box 6F, the computer system 40 can determine that the box 6F is blowing in the wind and therefore not a threat to the approaching train 6A (FIG. 1). Additionally, the computer system 40 can determine that the box 6F is open and empty and therefore not a threat. However, when the box 6F is closed and the tracking data indicates the box 6F has been located on the tracks 2 without moving, the computer system 40 cannot determine whether the box 6F constitutes a true threat or not. For example, the box 6F could still be empty, but the box 6F also could be filled with metal, explosives, and/or the like, which will present a threat to the train 6A and other objects 6B-6E in the area 10.

To address the latter situation and/or other similar situations, the computer system 40 can use the tracking data for the object 6F to make a judgment regarding the object 6F using any approach, which can be simple or complex to implement. For example, the computer system 40 can track objects moving into and out of the restricted area (e.g., where the tracks 2 cross the road 4) and determine whether an object has remained in the restricted area longer than expected. Using the vehicle 6B (FIG. 1) as an illustrative object, the computer system 40 can track the movement of the vehicle 6B from the time it enters the field of view as it approaches the crossing, slows down, and begins to cross. The speed of the vehicle 6B can be determined by interframe movement of the vehicle and use of the registration map described herein. In the event that the speed of the vehicle 6B drops to zero and the vehicle 6B remains in the crossing region for more than a short period of time, the computer system 40 can determine that the vehicle 6B has encountered some problem (e.g., mechanical, stuck, and/or the like). Depending on an amount of time to a critical event (e.g., a location of the nearest train 6A and an amount of time before it uses the railroad crossing) and the length of time that the vehicle 6B remains in the restricted area, the computer system 40 can determine that an alert condition exists and initiate action in response thereto.

In the case of the box 6F, the computer system 40 can use the tracking data to determine that the box 6F entered the field of view without action by another object, has been moving in a manner characteristic of tumbling (e.g., periodically leaving the ground plane and/or tumbling quickly in the wind), and/or the like. To facilitate a judgment as to whether wind-assisted movement is expected for the box 6F, the computer system 40 can use data acquired from other components, such as a wind speed sensor (anemometer), which can be deployed as part of the monitoring assembly 22 (FIG. 2).

For a box 6F containing heavier material, such a box 6F would not be expected to move in the wind and would have been placed, either accidently (e.g., falling from a vehicle) or purposefully, in the restricted area by another object. To this extent, the computer system 40 can use tracking data for other objects and knowledge regarding the consistency of shapes and objects to determine how the box 6F arrived at the location. For example, if a vehicle 6B enters and leaves the restricted area and the box 6F is first identified as being located within the restricted area after such time, the computer system 40 can determine that the box 6F was left in the restricted area by the vehicle 6B.

Furthermore, the computer system 40 can determine the manner in which the box 6F was placed in the restricted area. For example, if the box 6F falls from the vehicle 6B and the fall is captured in the image data, the computer system 40 can analyze the fall to determine an estimate of a density of the box 6F as an empty/light box will tend to fall differently than a box of the same size loaded with heavy materials. The computer system 40 can infer intent from the tracked movement of the vehicle 6B. For example, if the vehicle 6B is seen temporarily stopping in the restricted area, or going over a bump at a high rate of speed, the computer system 40 can infer that the box 6F was purposefully or not purposefully placed in the restricted area. Similarly, if the computer system 40 tracks the box 6F to one or more humans 6D (FIG. 1) purposefully placing the box 6F in the restricted area, the computer system 40 can infer malicious intent and a potential danger to an approaching train 6A. It is understood that these situations are only illustrative of various similar circumstances that the computer system 40 can recognize using any known solution of analysis or processing.

In some applications, an entirety of the restricted area is not visible to the camera(s) of the monitoring system 20. For example, a railroad-related restricted area extends along an entirety of the railroad tracks 2, not just at the railroad crossing 10 and the surrounding area. To this extent, the computer system 40 can determine an alert condition when an object of interest is within the restricted area when it moves out of the field of view of the camera(s). In this case, the monitoring system 20 can perform one or more actions, such as notifying some relevant personnel, providing information to another monitoring system 20, which can commence tracking the object, and/or the like.

While aspects of the invention have been shown and described in conjunction with a solution for monitoring an at-grade railroad crossing, it is understood that embodiments of the invention can be implemented to monitor any of various types of areas for any of various reasons.

For example, an embodiment can be utilized to monitor an area for security purposes, such as a portion of a secure area. To this extent, security for various installations, including private and military installations, often relies on human observers who are present at an entrance or in remote observation areas. In either case, humans can be distracted or inattentive while providing security. Furthermore, maintaining a significant manned presence at a checkpoint or in an observation area also can be a significant ongoing expense. Still further, humans have a difficult time seeing in various ambient conditions, including rain, darkness, snow, etc.

Figure 7:
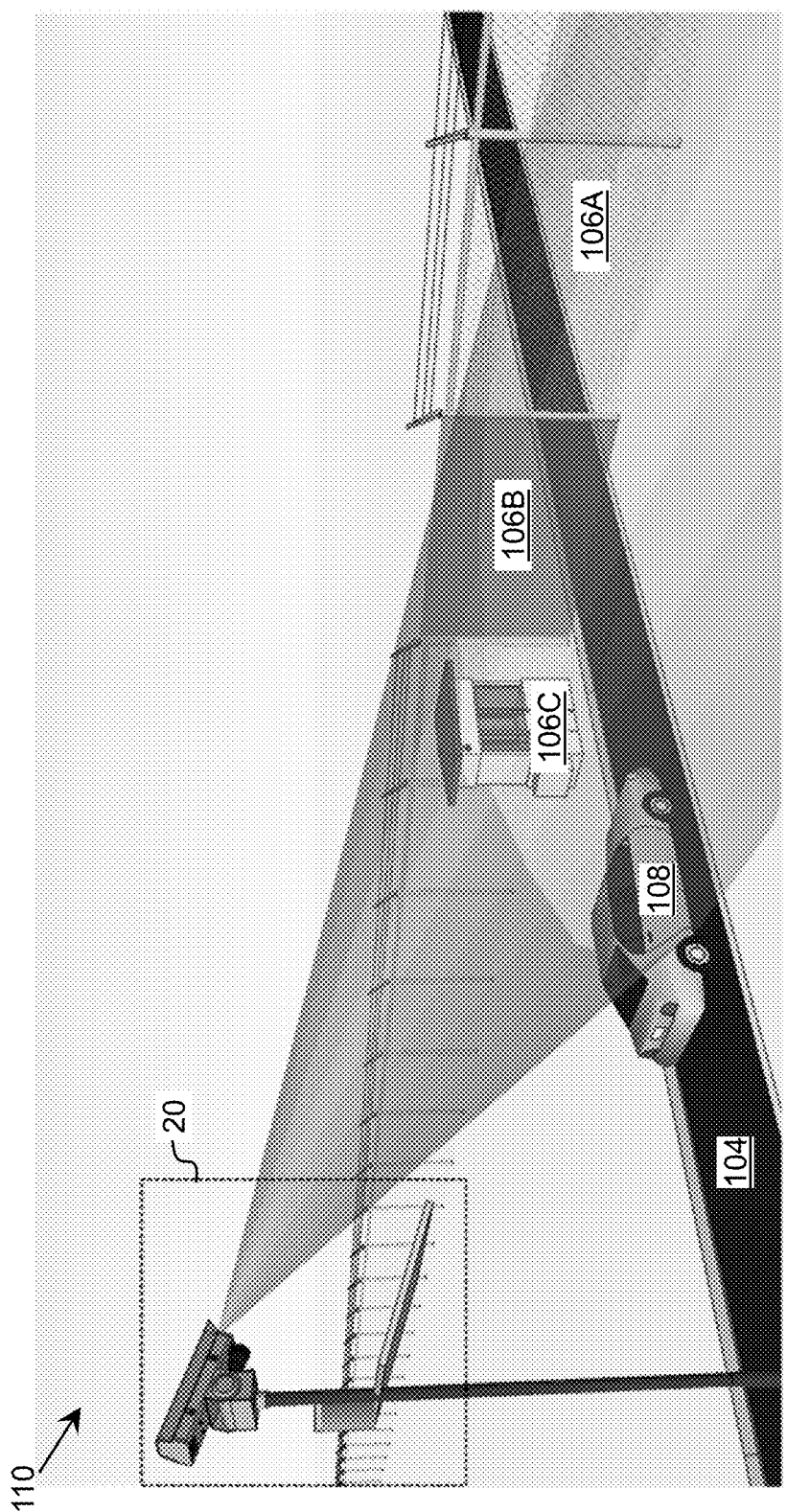
FIG. 7 shows a hypothetical image of an illustrative entry checkpoint to a secure area according to an embodiment.

FIG. 7 shows a hypothetical image of an illustrative entry checkpoint to a secure area 110 according to an embodiment. As illustrated, a monitoring system 20 can be located just outside the secure area and be mounted such that a field of view of the camera(s) of the system 20 includes a fence 106A, a gate region 106B, and a checkpoint building 106C of the entry checkpoint. Furthermore, a road 104 is visible in the field of view, on which various vehicles 108 may approach seeking to enter the secure area 110. As illustrated, the monitoring system 20 can be located on an opposite side of the road 104 as the checkpoint building 106C, where a guard will be normally located.

As described herein, the monitoring system 20 can be configured to construct a three-dimensional representation of the entry checkpoint area. To this extent, the fence 106A (e.g., with evenly spaced poles of known heights and/or evenly spaced wiring), the gate region 106B (e.g., having a known width), the checkpoint building 106C (e.g., having dimensions which are known or readily measured), and road 104 (e.g., including markings and/or known dimensions) provide references, which can enable the computer system 40 (FIG. 2) of the monitoring system 20 to self-calibrate and register pixels in the image data using an approach similar to that described in conjunction with the railroad crossing. During operation, as a target, such as a vehicle 108, approaches the gate region 106B, the computer system 40 can monitor its behavior for an alert condition. For example, in the event that all vehicles 108 are required to stop prior to being allowed to pass through the gate region 106B, the computer system 40 can identify an alert condition and immediately initiate action in response thereto should the vehicle 108 not stop.

In an embodiment, the field of view of the camera(s) of the monitoring system 20 covers a significantly larger area than the road 104 and the gate region 106B. In this case, the monitoring system 20 can detect attempts by individuals to scale the fence 106A even as the guard's attention at the checkpoint building 106C is diverted. To this extent, additional monitoring systems 20 could be deployed to provide full coverage of a perimeter of the secure area. Furthermore, a person attempting to sneak through the gate region 106B using a far side of the vehicle 108 from the guard as cover can be detected by the monitoring system 20, which can initiate appropriate action in response. Still further, the monitoring system 20 can identify particular anomalous characteristics of a vehicle 108, such as, for example, an anomalous heat source when the camera(s) include a thermal infrared camera. Use of multispectral imaging can make evading detection when entering the secure area 110 extraordinarily difficult.

In another application, a monitoring system 20 can be utilized as an on-demand monitor, such as a traffic monitor. Current traffic monitor approaches have limited processing capabilities and perform most of their computation in a central location. In contrast, a monitoring system 20 described herein can perform all analysis and decision-making onboard and can offer significantly greater performance than other approaches. For example, an embodiment of the monitoring system 20 can be configured to perform complex analysis, such as for planning and other public works purposes, which can provide important details from the behavior and volume of both vehicular and pedestrian traffic. Such analysis can include, for example: particular paths of travel that are most common for pedestrians as well as vehicles, time of day when volume typically peaks or is minimal, locations of bottlenecks for traffic traveling through an area, general flow of traffic through various intersections (e.g., amount of stopping/starting due to mistimed traffic signals), and/or the like. Furthermore, the monitoring system 20 can be installed on any convenient pole overlooking a region of interest, such as an intersection, and can perform self-calibration as described herein using ambient features, such as the road, and can be ready for use within a few minutes of installation. Moreover, as there are no specific general geometric requirements, a monitoring system 20 can be used and re-deployed at virtually any intersection, roadway, bridge, or other area of infrastructure for which monitoring is desired.

Still another embodiment can be utilized to monitor a sensitive area for security purposes. For example, railroads have an interest in preventing trespass into areas near and inside railroad tunnels and other safety or security sensitive areas. Not only is the likelihood of any intruder being injured or killed once inside a tunnel very high, but also anything which causes an accident within a tunnel has a much higher potential of serious damage and expense as it is considerably harder to clear a tunnel than an open section of track. In this embodiment, a monitoring system can be located such that an entire region near the sensitive area (e.g., a tunnel, tracks entering the tunnel, and other objects in the vicinity) are within the field of view. The computer system 40 (FIG. 2) can be configured to use objects in the field of view, such as the tunnel and tracks, and possibly other objects in the vicinity, as references for deriving the three-dimensional imaging space. The computer system 40 can perform similar analyses of behavior and objects in order to detect unwanted intrusions, identify suspicious objects, alert appropriate personnel or organizations, and/or the like, which can be tailored to the particular requirements of the application.

While shown and described herein as a method and system for monitoring an area, it is understood that aspects of the invention further provide various alternative embodiments. For example, in one embodiment, the invention provides a computer program fixed in at least one computer-readable medium, which when executed, enables a computer system to monitor an area. To this extent, the computer-readable medium includes program code, such as the monitoring program 50 (FIG. 2), which enables a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as the monitoring program 50 (FIG. 2), which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for monitoring an area. In this case, the generating can include configuring a computer system, such as the computer system 40 (FIG. 2), to implement the method of monitoring an area. The configuring can include obtaining (e.g., creating, maintaining, purchasing, modifying, using, making available, etc.) one or more hardware components, with or without one or more software modules, and setting up the components and/or modules to implement a process described herein. To this extent, the configuring can include deploying one or more components to the computer system, which can comprise one or more of:

(1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system comprising:
    a monitoring assembly configured to monitor an area, wherein the monitoring assembly includes:
        a computer system including means for monitoring the area, wherein the means for monitoring is configured to:
            identify objects in the area using image data of the area;
            identify a set of relevant objects from the objects identified in the area, wherein the identifying a set of relevant objects includes, for at least one object identified in the area, evaluating at least one of: a physical size of the object, a shape of the object, or a consistency of movement of the object, to classify the object as either a relevant object associated with evaluating at least one alert condition being monitored or an irrelevant object not associated with evaluating any alert condition being monitored;
            update tracking information for each relevant object in the set of relevant objects, wherein the tracking information includes a vector of movement history in the area of each relevant object in the set of relevant objects; and
            evaluate an alert condition using the updated tracking information for at least one of the set of relevant objects, wherein the evaluating includes evaluating a presence of a relevant object in a restricted zone with respect to the alert condition by inferring at least one of: an intent or a cause, of the relevant object being present in the area using the history of movement for the relevant object.

2. The system of claim 1, wherein the monitoring assembly further includes a plurality of imaging devices including at least two imaging devices sensitive to radiation of distinct wavelength ranges, wherein the fields of view of the at least two imaging devices are substantially co-registered at the area, wherein the image data includes image data substantially concurrently acquired by the at least two imaging devices, and wherein the identifying objects in the area includes:
    independently processing the image data acquired by each of the plurality of imaging devices to identify objects present in the area;
    fusing similar objects identified in the image data acquired by each of the plurality of imaging devices; and
    verifying objects identified in the image data acquired by only a portion of the plurality of imaging devices.

3. The system of claim 2, wherein the plurality of distinct wavelength ranges includes: near infrared and visible radiation and infrared radiation, the monitoring assembly further comprising a near infrared illuminator, wherein the means for monitoring is further configured to operate the near infrared illuminator to provide sufficient light for imaging the area with an imaging device sensitive to near infrared and visible radiation.

4. The system of claim 1, wherein the identifying a set of relevant objects further includes classifying at least one object identified in the area as being relevant or irrelevant based on an orientation of the object.

5. The system of claim 1, wherein the identifying a set of relevant objects further includes classifying at least one object identified in the area as being relevant or irrelevant based on a temperature difference between the object and at least one other object in the image data.

6. The system of claim 1, wherein the computer system is further configured to self-calibrate using a set of static features visible in the image data of the area.

7. The system of claim 6, wherein the set of static features includes at least one of: rails or ties for railroad tracks.

8. The system of claim 1, wherein the evaluating an alert condition includes discriminating between possible objects having similar appearance but different threat levels using at least one of: circumstances during movement of the object in the area or circumstances during movement of another object associated with the object in the restricted zone.

9. The system of claim 1, wherein the evaluating further uses an amount of time to a critical event.

10. The system of claim 9, wherein the restricted zone comprises a restricted path designated for use by authorized vehicles and the critical event comprises an authorized vehicle moving through the restricted zone using the restricted path.

11. A method comprising:
    a computer system identifying a set of relevant objects in an area, wherein the identifying includes identifying objects in the area using image data of the area and, for at least one object identified in the area, evaluating at least one of: a size of the object, a shape of the object, or a consistency of movement of the object, to classify the object as either a relevant object associated with evaluating at least one alert condition being monitored or an irrelevant object not associated with evaluating any alert condition being monitored;
    the computer system updating tracking information for each relevant object in the set of relevant objects, wherein the tracking information includes a vector of movement history in the area of each relevant object in the set of relevant objects;
    the computer system evaluating an alert condition using the updated tracking information for at least one of the set of relevant objects, wherein the evaluating includes evaluating a presence of a relevant object in a restricted zone with respect to the alert condition by inferring at least one of: an intent or a cause, of the relevant object being present in the area using the history of movement for the relevant object; and
    the computer system performing an action response to evaluating a presence of an alert condition.

12. The method of claim 11, further comprising the computer system self-calibrating and registering two-dimensional pixel data of the area into a three-dimensional model of the area using a plurality of static features visible in the image data of the area.

13. The method of claim 12, wherein the plurality of static features include at least one of: rails or ties for railroad tracks in the area.

14. The method of claim 11, wherein the identifying a set of relevant objects further includes classifying at least one object identified in the area as being relevant or irrelevant based on an orientation of the object.

15. The method of claim 11, wherein the identifying a set of relevant objects further includes classifying at least one object identified in the area as being relevant or irrelevant based on a temperature difference between the object and at least one other object in the image data.

16. The method of claim 11, wherein the evaluating an alert condition includes discriminating between possible objects having similar appearance but different threat levels using at least one of: circumstances during movement of the object in the area or circumstances during movement of another object associated with the object in the restricted zone.

17. A system for monitoring an area, the system comprising:
- a first imaging device sensitive to near infrared and visible radiation;
- a second imaging device sensitive to infrared radiation, wherein the fields of view of the first and second imaging devices are substantially co-registered at the area; and
- a computer system including means for monitoring the area, where in the means for monitoring is configured to:
  - identify objects in the area using image data substantially concurrently acquired by the first and second imaging devices;
  - identify a set of relevant objects from the objects identified in the area, wherein the identifying a set of relevant objects includes, for at least one object identified in the area, evaluating at least one of: a physical size of the object, a shape of the object, or a consistency of movement of the object, to classify the object as either a relevant object associated with evaluating at least one alert condition being monitored or an irrelevant object not associated with evaluating any alert condition being monitored;
  - update tracking information for each relevant object in the set of relevant objects, wherein the tracking information includes a vector of movement history in the area of each relevant object in the set of relevant objects; and
  - evaluate an alert condition using the tracking information for each of the set of relevant objects and an amount of time until a critical event, wherein the evaluating includes evaluating a presence of a relevant object in a restricted zone with respect to the alert condition by inferring at least one of: an intent or a cause, of the relevant object being present in the area using the history of movement for the relevant object.

18. The system of claim 17, wherein the updating uses a registration map mapping the image data to a three-dimensional model of the area.

19. The system of claim 17, wherein the identifying a set of relevant objects further includes, for at least one object identified in the area:
- determining a size and orientation of the object; and
- classifying the object as relevant or irrelevant based on at least one of: the size or orientation of the object.

20. The system of claim 17, the system further comprising a near infrared illuminator, wherein the means for monitoring is further configured to operate the near infrared illuminator to provide sufficient light for imaging the restricted area with the first imaging devices.

* * * * *